United States Patent [19]

Porter

[11] Patent Number: 4,608,621
[45] Date of Patent: Aug. 26, 1986

[54] TRANSPORT APPARATUS FOR ELECTRICAL EQUIPMENT

[75] Inventor: Warren W. Porter, Escondido, Calif.
[73] Assignee: NCR Corporation, Dayton, Ohio
[21] Appl. No.: 701,845
[22] Filed: Feb. 14, 1985
[51] Int. Cl.[4] .............................................. H02B 1/20
[52] U.S. Cl. ..................................... 361/428; 361/391
[58] Field of Search ................. 174/DIG. 9; 312/223; 361/331, 356, 335–339, 428, 390, 391, 392, 393

[56] References Cited

U.S. PATENT DOCUMENTS

| | | | |
|---|---|---|---|
| 2,173,101 | 9/1939 | Fiedler | 361/338 |
| 2,434,918 | 1/1948 | Gall | 174/70 R |
| 3,335,326 | 8/1967 | Bonin et al. | 317/99 |
| 3,335,336 | 8/1967 | Koichi | 357/68 |
| 3,710,199 | 1/1973 | Cignoni, Jr. | 361/428 |
| 3,792,189 | 2/1974 | Stengel | 174/DIG. 9 |

Primary Examiner—G. P. Tolin
Attorney, Agent, or Firm—Wilbert Hawk, Jr.; Edward Dugas; Richard W. Lavin

[57] ABSTRACT

A support apparatus for a cabinet on the like includes a stationary support member having a cut-out portion in which are located electrical cables interconnecting an assemble of cabinets. Slidable mounted on the stationary support member is a cabinet support member having cam rollers rotatably mounted in a cam track located along the top edge of the stationary support member allowing the cabinet support member to move along the stationary support without engaging the interconnecting cables.

5 Claims, 6 Drawing Figures

TRANSPORT APPARATUS FOR ELECTRICAL EQUIPMENT

BACKGROUND OF THE INVENTION

This invention relates generally to cabinets housing electrical equipment having multiple cables extending between groups of such cabinets and more particularly to means for movably supporting each of the cabinets enabling the cabinets to be moved without interfering with the cables extending between the other cabinets in the group.

In assembling modules of a computer system, each module is mounted within a cabinet which is then positioned in a side-by-side relationship with other cabinets housing similar computer modules. Each module is interconnected by cables which extend between each of the cabinets. When cabinets are assembled in this manner, prior computer systems have located the cables along the bottom of the cabinets. Such systems have had cabinets constructed to include a front panel or door, mounted so that it may be opened or removed from the cabinet structure for gaining access to the electrical equipment within the cabinet to repair such equipment. Where the electrical equipment mounted within the cabinets necessitates access to the cabinet from the side of the cabinet, cabinets have been constructed with rollers allowing the cabinet to be removed from the assembly. It has been found that in removing the cabinets under these conditions, cables which are located adjacent the cabinet being removed have become entangled with the rollers of the cabinet being moved resulting in damage to the cables and the loss of electrical signals in the cables. In order to overcome this problem, there has been developed complex structures to support cables in such situations. Thus in U.S. Pat. No. 3,335,326, issued to R. E. Bonin et al. on Aug. 8, 1967, hinged frame members are employed which may be moved without moving the cables supported thereon. In U.S. Pat. No. 2,434,918, issued to J. E. Gass on Jan. 27, 1948 a movable support member supporting the cables is supplied allowing the cables to be moved in conjunction with the cabinet.

It is therefore a principle object of this invention to provide a support apparatus for a cabinet or other type of housing member which allows the cabinets containing electrical equipment to be moved without entangling the cables interconnecting other cabinets containing electrical equipment.

It is a further object of this invention to provide a support structure for a cabinet containing electrical equipment which enables the cabinet to be removed from an assembly of such cabinets mounted in a side-by-side relationship without damaging the electrical cables interconnecting the remaining cabinets.

It is another object of this invention to provide a cabinet support structure which is simple in construction and low in cost.

SUMMARY OF THE INVENTION

In order to fulfill these objects, there is provided a support assembly for supporting a cabinet or other type of housing member containing electrical equipment which has been mounted in a side-by-side arrangement with other similar type cabinets which includes a stationary support member having a pair of oppositely positioned S-shaped channel members each mounted along the upper edge of opposite side wall portions of the support member. Each of the side wall portions includes a cut-out portion located along the lower edge of the side wall portions in which are positioned cables extending in a transverse direction to the longitudinal axis of the support member which interconnect with electrical equipment in the other cabinets of the assembly. A movable support member associated with the stationary support member supports a cabinet containing electrical equipment and includes rollers supporting one end of the movable support member and a pair of cam roller members positioned within the channel members which enables the movable support member to slide along the top of the stationary support member without engaging the cables positioned within the cut-out portion of the stationary support member. The stationary support member further includes a cable guide member which forms a compartment in the stationary support member allowing the cable associated with the cabinets supported on the movable support member to have sufficient slack so as to prevent the cable from being damaged upon movement of the cabinet.

BRIEF DESCRIPTION OF THE DRAWINGS

Additional advantages and the features of the present invention will become apparent and fully understood from the reading of the following description taken together with the annexed drawings.

DESCRIPTION OF A PREFERRED EMBODIMENT

Figure 1:
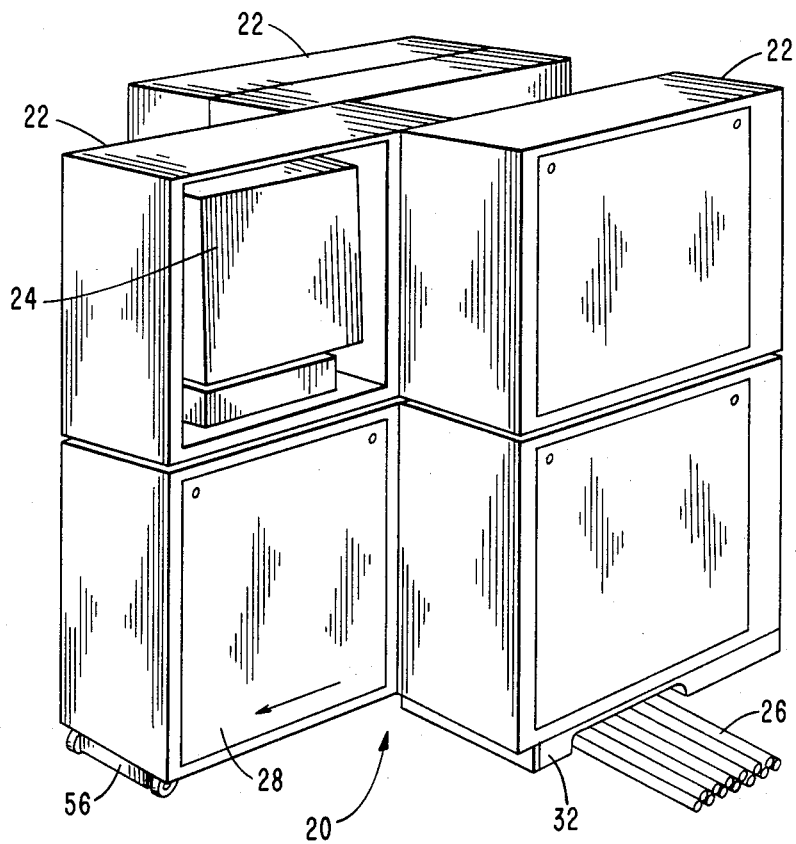
FIG. 1 is a perspective view of an assembly of cabinets each housing electrical equipment showing the position of one of the cabinets when removed from the assembly.

Referring now to FIG. 1, there is shown a perspective view of an assembly of aligned cabinets generally indicated by the numeral 20 in which each of the cabinets 22 contain electrical equipment 24 associated with a computer system. Extending along the bottom edge of the aligned cabinets 22 are a number of cables 26 which interconnect the electrical equipment located within the cabinets 22 and other elements of the computer system such as work stations and the like. Due to the construction of the electrical equipment 24 located within the cabinets 22, it is necessary to gain access to the side of the cabinets 22 in order to perform maintenance and other repair operations on the equipment. In fulfilling this requirement, the cabinet is required to be removed from the assembly 20 in the direction of the arrow as shown in FIG. 1 allowing a side panel 28 of the cabinet to be removed exposing the electrical equipment 24.

Figure 4:
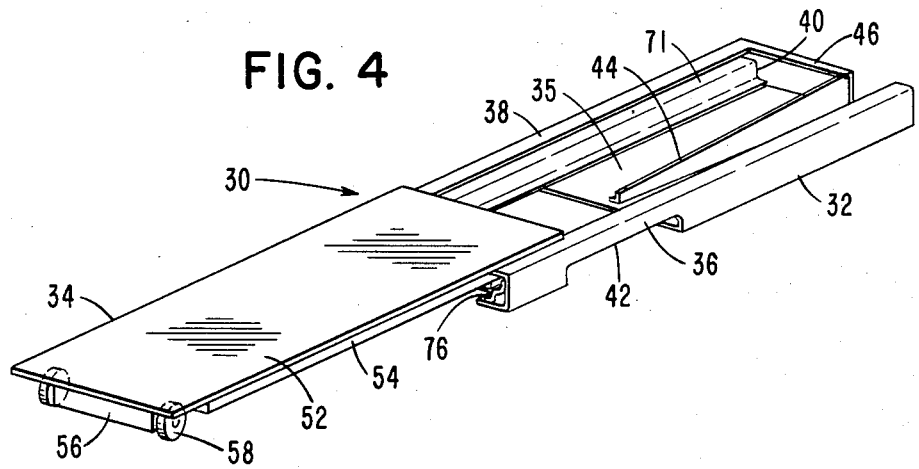
FIG. 4 is a perspective view of the support assembly of the present invention showing the movable support member in a withdrawn position.

In order accommodate the movement of the cabinet 22 from the assembly 20 and to prevent the cables 26 from being damaged during such movement, there is provided a support assembly generally indicated by the numeral 30 (FIG. 4) which includes a stationary support member 32 and a movable support member 34. The stationary support member 32 includes a base or floor portion 35 and a pair of side wall portions 36 and 38, each of which has mounted thereto a S-shaped channel member 40 (FIGS. 4 and 5) forming a cam track and extending along the top edge of said side wall portion 36 and 38. The channel members 40 are secured to the side wall portions by any conventional fasting process such as welding. Each side wall portion 36 and 38 includes a cut-out portion 42 extending along a portion of the lower edge of the side wall portions and through the base portion 35. A vertically orientated cable guide member 44 secured to the base portion 35 by any conventional fastening means such as welding engages a rear wall portion 46 of the support member 32 forming a compartment with the side wall portion 36 generally indicated by the numeral 48 (FIGS. 2 and 5) in which the cables 26 associated with the cabinet 22 mounted on the support assembly 30 are positioned within the compartment 48 in a slack condition allowing the cabinet 22 to be removed from the assembly 30 without damaging the cables extending into the cabinet and extending throughout the assembly 30.

Slidably mounted on the stationary support member 32 is a movable support member 34 on which is positioned one of the cabinets 22 (FIG. 1). The support member 34 includes a base support member 52 configured to support one of the cabinets 22. A pair of depending rail members 54 (FIGS. 2–5 inclusive) are secured to the lower surface of the base member 52 inwardly from the side edge of the base member and extending along the longitudinal axis of the base support member. Mounted adjacent a depending end member 56, secured to the lower surface of the base member 52, are a pair of roller or caster members 58 rotatably mounted on a support member 60 (FIG. 6) secured to a support member 62 which in turn is secured to the lower surface of the base member 52. Secured to the side surface of each of the rail members 54 (FIGS. 5 and 6) is an L-shaped guide member 64 which coacts with a corresponding S-shaped channel member 40 on the stationary support member 32 to guide the movement of the movable support member 34 on the stationary support member 32.

Figure 2:
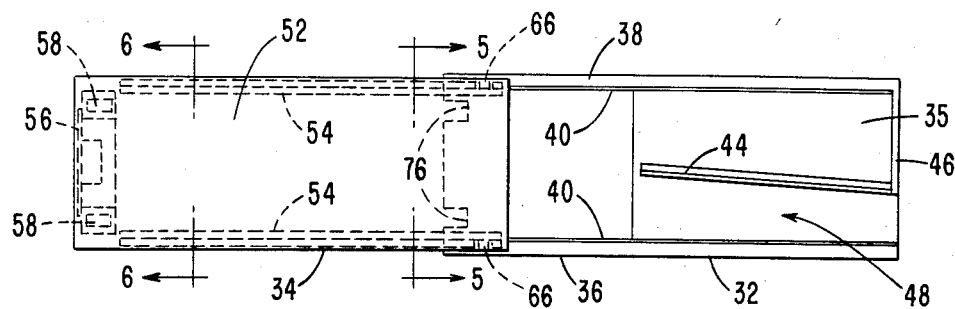
FIG. 2 is a top view of the support assembly of the present invention.
Figure 3:
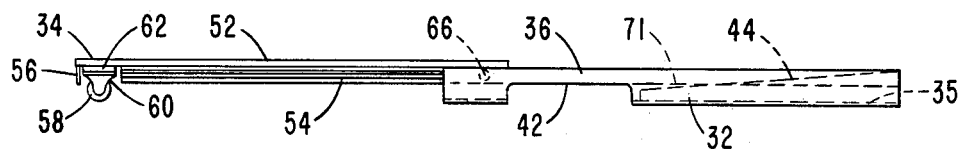
FIG. 3 is a side view of the support assembly of the present invention.
Figure 5:
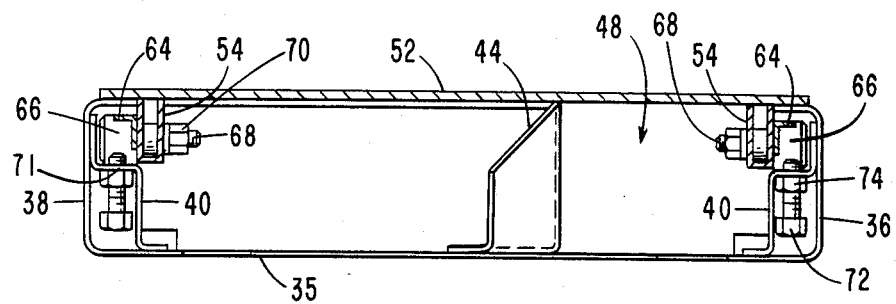
FIG. 5 is a sectional view taken on lines 5—5 of FIG. 2 showing details of the mounting of cam rollers within the cam track.
Figure 6:
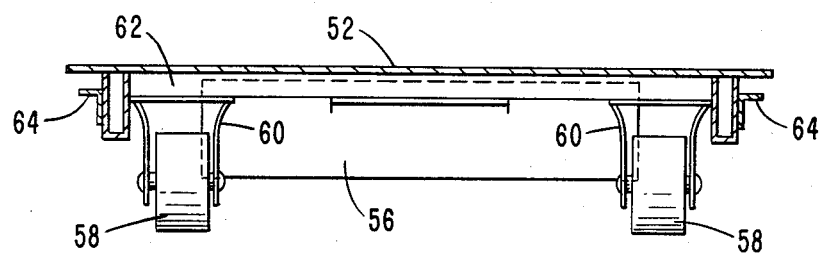
FIG. 6 is a sectional view taken on lines 6—6 of FIG. 2 showing details of the construction of the movable support member.

Rotatably secured to one end of the rail members 54 adjacent the front end of the base member 52 are a pair of cam roller members 66 (FIGS. 2, 3 and 5). As shown in FIG. 5, the roller members 66 are rotatably mounted on a stud 68 secured to the guide member 54 in any conventional manner such as the nut 70. The cam roller members 66 are positioned on a horizontal surface 71 of an associated channel member 40 on the support member 32 after which a bolt or other type of stop member 72 is secured to the channel member 40 by threading the bolt 72 through a nut 74 welded to the channel member 40 thereby blocking removal of the roller members 66 from the channel member 40.

In mounting the assembly 30 to one of the cabinets 22 (FIG. 1), the cables 26 extending from the cabinet are first folded to lay within the compartment 48 (FIGS. 2 and 5) to provide slack in the cable thereby preventing any damage to the cable during removal of the cabinet from the assembly 20 (FIG. 1). After the cables 26 have been positioned within the stationary support member 32, the remaining portion of the cables 26 are then threaded through the cut-out portion 42 of each of the support members 32 (FIG. 1) supporting the remaining cabinets 22 of the assembly.

Once the cabinets 22 have been mounted on their support assembly 30 and the cables 26 have been properly positioned within the cut-out portions 42 in the support members 32, removal of one of the cabinets 22 from the assembly results in the support member 34 sliding along the top of the support member 32 by the action of the cam roller members 66 within the channel members 40. This movement will occur without damaging any of the cables 26 interconnecting the remaining cabinets 22 of the assembly 20. A pair of cut-out portions 76 (FIG. 2) located in the floor portion 35 of the support member 32 accommodates the caster members 58 (FIG. 3) when the movable support member 34 is in its home position.

It wil be seen that the construction as described allows cables to be laid in the shortest distance between the electrical equipment without requiring elaborate and complex structures to accommodate the mounting of cables between operating elements of a computer system. This construction allows the equipment to be moved for service without damaging interconnecting cables.

While the principles of the invention have now been made clear in an illustrated embodiment, it will be obvious that those skilled in the art that many modifications of structure, arrangements, elements and components can be made which are particularly adapted for specific environments and operating requirements without departing from these principles. The appended claims are therefore intended to cover and embrace any such modifications, within limits only of the true spirit and scope of the invention.

I claim:

1. In the assembly of housing members each containing electrical equipment and positioned in a side-by-side arrangement in which electrical cables interconnecting the electrical equipment extend adjacent the bottom surfaces of the housing members, an apparatus movably supporting a housing member comprising;

a first elongated support member which includes a pair of side wall portions each having a cut-out portion positioned along the lower edge of the side wall portions in which are located electrical cables interconnecting the housing members of the assembly and extending in a direction transverse to the longitudinal axis of the first support member, said side wall portions each include a roller support surface extending in a longitudinal direction along the upper edge of the side wall portions of the support members;

and a second elongated support member supporting a housing member, said second support member includes a pair of roller members secured to one end of the second support member and a pair of cam roller members located at the opposite end of the second support member and positioned on said roller support surfaces enabling the second support member to slide on said first support member whereby the housing member supported on said second support member is moved in a direction enabling the housing member to be removed from the assembly without engaging the cables located in said cut-out portion and interconnecting other housing members of the assembly.

2. The apparatus of claim 1 in which said first support member includes a guide member which forms with one of said side wall portions a compartment for storing cables associated with the housing member supported on said second support member in a slack condition enabling the housing member supported on said second support member to be moved from said first support member without damaging its associated cables which are connected to other housing members in the assembly.

3. The apparatus of claim 2 in which said roller support surface comprises a channel member secured to the side wall portions and extending in a direction along the top surface of the side wall portions, said apparatus further includes a removable stop member inserted through the channel member after a cam roller member has been inserted into the channel member for holding said cam roller member in said channel member.

4. In an assembly of cabinets each containing electrical equipment associated with a computer system, the cabinets being positioned in a side-by-side arrangement in which electrical cables interconnecting the electrical equipment in the cabinets extends along the bottom of the cabinets in the assembly, an apparatus movably supporting a cabinet within the assembly comprising;

an elongated stationary support member including a pair of oppositely positioned parallel side wall portions each having a cut-out portion located intermediate its ends and adjacent its lower edge in which are positioned the cables interconnecting the electrical equipment, the cables being oriented in a diretion transverse to the longitudinal axis of the stationary support member;

a pair of inwardly facing cam track members secured along the top edge of said side wall portions;

an elongated movable support member;

a pair of roller members rotatably mounted to one end of the movable support member;

a pair of elongated rail members secured to said movable support member;

a pair of cam roller members rotatably secured to said rail members and located adjacent the opposite end of said movable support member, each of said cam roller members being located in one of said track members secured to said stationary support member enabling the movable support member to slide on said stationary support member;

and means removably mounted in said track members for blocking the removal of the cam roller members from the track members whereby the cabinet positioned on said movable support member is moved in a direction enabling the cabinet to be removed from the assembly without engaging the cables interconnecting the electrical equipment in the other cabinets of the assembly.

5. The apparatus of claim 4 in which said stationary support member includes a guide member which forms with one of said side wall portions a compartment for storing cables associated with the cabinet positioned on said movable support member in a slack condition enabling the cabinet positioned on said movable support member to be moved on said stationary support member without damaging its associated cables connected to other cabinets in the assembly.

* * * * *